United States Patent
Sato et al.

(10) Patent No.: US 6,824,921 B2
(45) Date of Patent: Nov. 30, 2004

(54) NEGATIVE ELECTRODE MATERIAL FOR NON-AQUEOUS ELECTROLYTE SECONDARY BATTERY AND METHOD FOR PRODUCING THE SAME

(75) Inventors: Toshitada Sato, Osaka (JP); Takayuki Nakamoto, Moriguchi (JP); Harunari Shimamura, Moriguchi (JP); Kazuhiro Okamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 379 days.

(21) Appl. No.: 09/999,588

(22) Filed: Nov. 15, 2001

(65) Prior Publication Data
US 2002/0086207 A1 Jul. 4, 2002

(30) Foreign Application Priority Data
Nov. 15, 2000 (JP) .................................. 2000-348790
Jun. 21, 2001 (JP) .................................. 2001-187848

(51) Int. Cl.$^7$ .................. H01M 4/58; H01M 4/50; H01M 4/56; H01M 4/42; C01B 21/06
(52) U.S. Cl. .................. 429/218.1; 429/221; 429/224; 429/225; 429/229; 429/231.5; 429/231.6; 423/409
(58) Field of Search .................. 429/218.1, 221, 429/224, 231.5, 231.6, 225, 229

(56) References Cited

U.S. PATENT DOCUMENTS 6,403,257 B1 * 6/2002 Christian et al. ........... 429/224
6,541,157 B1 * 4/2003 Inagaki et al. ........... 429/231.9
6,558,841 B1 * 5/2003 Nakagiri et al. ......... 429/218.1

FOREIGN PATENT DOCUMENTS

| EP | 1 043 789 A1 | 10/2000 |
| JP | 11-086853 A | 3/1999 |
| JP | 11-086854 A | 3/1999 |
| WO | WO 99/49532 A1 | 9/1999 |

OTHER PUBLICATIONS

P. Limhongkul, "The Partial Reduction Approach: A Novel Way to Produce Composite Li–ion Battery Anodes", The Electrochemical S 198$^{th}$ Meeting Phoenix, Arizona, (Oct. 22–27, 2000).

\* cited by examiner

*Primary Examiner*—Stephen Kalfut
*Assistant Examiner*—Thomas H. Parsons
(74) *Attorney, Agent, or Firm*—Akin Gump Strauss Hauer & Feld LLP

(57) ABSTRACT

A method for producing a negative electrode material for a non-aqueous electrolyte secondary battery is disclosed: which includes a step of applying a shearing force to an intermetallic compound under the presence of nitrogen. The intermetallic compound contains element(A) which reacts with nitrogen and forms a nitride, but does not react with lithium, and element(B) which does not react with nitrogen, but reacts with lithium, thereby forming a mixture containing a nitride of element(A) and a substance of element(B).

22 Claims, 3 Drawing Sheets

NEGATIVE ELECTRODE MATERIAL FOR NON-AQUEOUS ELECTROLYTE SECONDARY BATTERY AND METHOD FOR PRODUCING THE SAME

BACKGROUND OF THE INVENTION

The present invention relates to a negative electrode material for a non-aqueous electrolyte secondary battery and a method for producing the same. Also, the present invention relates to a negative electrode containing the above negative electrode material, as well as to a non-aqueous electrolyte secondary battery having such negative electrode and exhibiting a high capacity and a long cycle life.

As the negative electrode for a non-aqueous electrolyte secondary battery, metallic lithium or lithium compounds have been intensively studied because they can realize a high energy density and high voltage. On the other hand, as the positive electrode, oxides and chalcogenides of transition metals such as $LiMn_2O_4$, $LiCoO_2$, $LiNiO_2$, $V_2O_5$, $Cr_2O_5$, $MnO_2$, $TiS_2$, $MoS_2$ and the like have been studied. These materials are known to have a layered or tunneled structure that allows free intercalation and deintercalation of lithium ions.

There is a drawback that, when metallic lithium is used in the negative electrode, a deposition of lithium dendrites occurs on the surface of the metallic lithium in the negative electrode during charging, which reduces the charge/discharge efficiency of the battery or causes internal short-circuiting due to contact between formed lithium dendrites and the positive electrode. For this reason, lithium ion batteries have recently been put into practical use that use in the negative electrode graphite type carbon materials which can reversibly absorb and desorb lithium, and have an excellent cycle life and good safety, though the carbon materials have a smaller capacity than metallic lithium.

However, when carbon materials are used in the negative electrode, the fact that the practical capacity thereof is as small as 350 mAh/g and that the theoretical density thereof is as low as 2.2 g/cc presents an obstacle for achieving batteries with a high capacity. Consequently, the use of metallic materials having a higher practical capacity is desired as the negative electrode material.

On the other hand, when metallic materials are used as the negative electrode active material, there is a problem that the active material repeatedly expands and contracts, thereby pulverizing the active material along with absorption and desorption of lithium. The pulverized active material particles lose contact with other particles of the active material or electrically conductive agent in the negative electrode to become inactive, which reduces the electrical conductivity of the negative electrode as well as the capacity.

For solving this problem, there has been proposed a method of allowing a phase absorbing lithium to coexist with a phase not absorbing lithium in one particle of the active material (Japanese Laid-Open Patent Publication No. Hei 11-86854). In this case, the phase not absorbing lithium relaxes the stress caused in the active material particle due to absorption of lithium, and thereby suppresses expansion and pulverization of the active material.

Further, there has been a suggestion in which two or more phases absorbing lithium are allowed to coexist in one particle of the active material, intending to relax the stress by the change in the structure during absorbing lithium of each phase (Japanese Laid-Open Patent Publication No. Hei 11-86853). In this case, it is considered that, since a plurality of minute phases exist in the active material particles, it is possible to let the stress go to the interface of the crystal grains at the time of absorption of lithium.

However, negative electrode active materials capable of sufficiently suppressing the expansion and pulverization of the active material by relaxing the stress caused by absorption of lithium, have not been achieved so far because an appropriate synthesizing method of the active material has not been found.

For example, by conventional methods such as atomizing method and roll quenching method, the crystal grain size of each phase is as large as several microns at minimum, and therefore effective stress relaxation is not possible.

Also, by conventional methods of mechanically applying a shearing force to raw materials comprising simple substances such as mechanical alloying method and mechanical grinding method under vacuum or argon atmosphere, crystal grains in the range of less than several microns to several nanometers can be formed; however, these methods are not practical since a variety of phases of substances having a variety of compositions are formed and the control of phase formation is difficult.

BRIEF SUMMARY OF THE INVENTION

An object of the present invention is to provide a negative electrode material that sufficiently suppresses the expansion or pulverization thereof by relaxation of the stress caused during absorption of lithium in the negative electrode material. Also, the present invention has another object of providing a non-aqueous electrolyte secondary battery which is equipped with a negative electrode containing the above negative electrode material and which has a high capacity, a long cycle life and excellent high rate discharge characteristics.

The present invention relates to a method for producing a negative electrode material for a non-aqueous electrolyte secondary battery including a step of, applying a shearing force or a shearing stress to a raw material comprising an intermetallic compound under a nitrogen-containing atmosphere to make the intermetallic compound react with nitrogen. The raw material comprising an intermetallic compound is well known in the art.

The intermetallic compound comprises: at least one element(A) which reacts with nitrogen and forms a nitride, but is substantially non-reactive with lithium; and at least one element(B) that is substantially non-reactive with nitrogen, but reacts with lithium.

The intermetallic compound forms a mixture containing at least one nitride of element(A), and at least one substance of element(B) by the above reaction with nitrogen. It is preferable that 30% or more of element(A) in the intermetallic compound converts into a nitride of element(A) by the step of applying a shearing force to the raw material.

The present invention also relates to a method for producing a negative electrode material for a non-aqueous electrolyte secondary battery including the steps of: providing an intermetallic compound comprising at least one element(A) selected from the group A consisting of Ce, Co, Cr, Fe, La, Mn, Mo, Nb, P, Sc, Sr, Ta, Ti, V, Y, Yb, Zr, B, Ca, Mg, Na and Zn, and at least one element(B) selected from the group B consisting of Ge, Sn, Pb, Sb and Bi, and applying a shearing force to the intermetallic compound under a nitrogen-containing atmosphere to make the intermetallic compound react with nitrogen, thereby forming a mixture containing at least one nitride of element(A) and at least one substance of element(B).

The aforementioned nitrogen-containing atmosphere is preferably an atmosphere of a gas containing 50% by volume or more of nitrogen.

The pressure of the aforementioned gas is preferably $1.0\times10^5$ Pa or more.

The step of applying a shearing force to the raw material, as described above, is preferably performed by a mechanochemical method using for example a ball milling system. The mechanochemical method is obvious to one of ordinary skill in the art.

The present invention also relates to a method for producing a negative electrode material for a non-aqueous electrolyte secondary battery including the steps of: providing an intermetallic compound comprising at least one element(A) selected from the group A consisting of Ce, Co, Cr, Fe, La, Mn, Mo, Nb, P, Sc, Sr, Ta, Ti, V, Y, Yb, Zr, B, Ca, Mg, Na and Zn, and at least one element(B) selected from the group B consisting of Ge, Sn, Pb, Sb and Bi, mixing the intermetallic compound with a compound containing nitrogen to obtain a raw material mixture comprising the intermetallic compound and the compound containing nitrogen, and applying a shearing force to the resultant raw material mixture to make the intermetallic compound react with the compound containing nitrogen, thereby forming a mixture containing at least one nitride of element(A), and at least one substance of element(B).

The aforementioned step of applying a shearing force to the raw material mixture is preferably performed by a mechanochemical method and is preferably conducted under an inert atmosphere containing argon.

The compound containing nitrogen preferably contains at least one element(C) selected from the group C consisting of B, Ba, C, Ca, Ce, Co, Cr, Fe, La, Li, Mg, Mn, Na, Nb, Sr, Ta, V, Y and Yb.

Alternatively, the compound containing nitrogen preferably contains at least one element(D) selected from the group D consisting of Al, Ga and Si. In this case, since an active simple substance of element(D) is formed during the nitrogenation reaction of the raw material, a negative electrode material having a high capacity can be obtained.

The average particle size of the above-mentioned intermetallic compound is preferably 200 μm or less.

The above-mentioned intermetallic compound is preferably represented by the general formula: $A^1{}_xB^1$, where $A^1$ is at least one element(A) selected from the group A, $B^1$ is at least one element(B) selected from the group B, and $0.25 \leq x \leq 4$.

In the general formula: $A^1{}_xB^1$, $A^1$ is preferably Ti or Zr, and $B^1$ is preferably Sn.

The present invention also relates to a negative electrode material for a non-aqueous electrolyte secondary battery comprising: at least one nitride of element(A) selected from the group A consisting of Ce, Co, Cr, Fe, La, Mn, Mo, Nb, P, Sc, Sr, Ta, Ti, V, Y, Yb, Zr, B, Ca, Mg, Na and Zn; and at least one substance of element(B) selected from the group B consisting of Ge, Sn, Pb, Sb and Bi; wherein the average crystal grain size of the above nitride is 0.001 to 0.1 μm.

In this negative electrode material, the content of nitrogen is preferably 1.0% by weight or more.

The present invention also relates to a negative electrode for a non-aqueous electrolyte secondary battery comprising the aforementioned negative electrode material. The content of the negative electrode material in the negative electrode is generally 15 to 95% by weight. The negative electrode further comprises a binder, an electrically conductive agent and the like.

The present invention further relates to a non-aqueous electrolyte secondary battery comprising the aforementioned negative electrode, a positive electrode capable of absorbing and desorbing lithium, and a non-aqueous electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
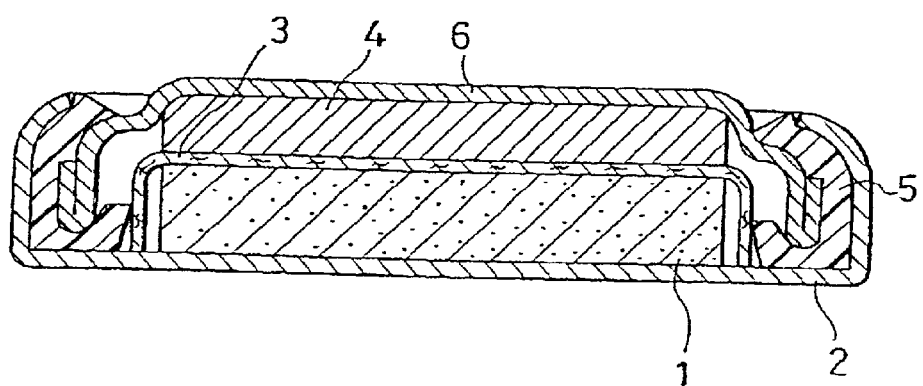
FIG. 1 is a longitudinal cross sectional view of a test cell used in the following Examples for measurement of discharge capacity, equipped with a negative electrode containing the negative electrode material of the present invention.

Syntheses of a negative electrode material comprising an alloy have conventionally been carried out under an atmosphere of an inert gas such as argon in order to suppress side reactions such as nitrogenation and oxidation. The present invention has been made as a result of reexamining such a conventional technique. The present invention has characteristics in including a step of applying a shearing force to an intermetallic compound under the presence of nitrogen or a compound containing nitrogen, thereby to make the intermetallic compound react with nitrogen or the compound containing nitrogen. By carrying out this step, a negative electrode material that gives a negative electrode having a higher capacity and a longer cycle life than conventional one can be obtained.

In the aforementioned step, element(A) reacts with nitrogen as in the following formula, for example. The reaction allows element(B), which has been constituting the intermetallic compound in combination with element(A) until this reaction takes place, to deposit as a simple substance.

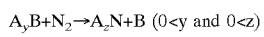

$A_yB+N_2 \rightarrow A_zN+B$ (0<y and 0<z)

With this reaction, a minute simple substance of element (B), which is an active phase reacting electrochemically with lithium, is formed.

The above nitrogen-containing atmosphere is preferably an atmosphere of a gas containing 50 to 100% by volume of nitrogen. When the ratio of nitrogen is less than 50% by volume, the progress of nitriding reaction or nitrogenation of element(A) is slow, which impairs practicability. The pressure of the gas containing nitrogen is preferably $1.0\times10^5$ Pa or more constantly. Thus, it is effective to supply nitrogen during the nitriding reaction in order to prevent the pressure of the atmosphere from decreasing to less than the above pressure due to consumption of nitrogen.

Although oxygen is also considered to have an effect of accelerating the formation of a simple substance of element (B), it is desirable to carry out the above reaction under an atmosphere containing no oxygen from the viewpoint of preventing most atoms of element(B) from being oxidized during oxidation of element(A). If oxygen is contained too much in the atmosphere, element(B) is excessively oxidized with oxygen, causing so much reduction reaction of the resultant oxide before absorption of lithium during charging of the battery, thereby increasing the irreversible capacity of the material.

Element(A) selected from the group A consisting of Ce, Co, Cr, Fe, La, Mn, Mo, Nb, P, Sc, Sr, Ta, Ti, V, Y, Yb, Zr, B, Ca, Mg, Na and Zn is capable of forming a nitride by reacting chemically with nitrogen. On the other hand, Element(B) selected from the group B consisting of Ge, Sn, Pb, Sb and Bi is capable of readily forming an alloy by reacting chemically with lithium, and the simple substance of element(B) has a sufficient capacity for lithium absorption as the negative electrode material. Different from element (A), element(B) hardly reacts with nitrogen.

In particular, Ti or Zr is preferable as element(A) and Sn is preferable as element(B) because a negative electrode material which can give a negative electrode having a high capacity and a long cycle life can be obtained. For example, $Ti_xSn$ and $Zr_xSn$ ($0.25 \leq x \leq 4$) is preferable as the raw material.

In the method for producing the negative electrode material of the present invention, a raw material comprising an intermetallic compound containing elements selected from the group A and the group B respectively is used. In the crystal structure of such intermetallic compound, element (A) and element(B) have already been mixed to very fine level or atomic level. Accordingly, in the material after the above nitriding reaction, the crystal grains in a phase of the nitride of element(A), and the crystal grains in a phase of the simple substance of element(B) are very minute, and the both phases are dispersed homogenously.

In addition, when an intermetallic compound is used as the raw material, the manufacturing cost can be reduced as compared with the conventional case of using a powder of a simple substance as the raw material. In particular, in the case where a material containing an element such as Ti, the simple substance of which is very hard and difficult to be pulverized, is synthesized, the manufacturing cost can be greatly reduced by using an intermetallic compound.

The average particle size of the intermetallic compound is preferably as small as possible, and particularly 200 μm or less. When the average particle size of the intermetallic compound exceeds 200 μm, the above-mentioned step of carrying out the nitriding reaction takes a long time.

In order to allow the nitriding reaction to proceed efficiently, it is necessary to apply a shearing force to the raw material by a mechanochemical method. Unless the raw material is provided with a shearing force, the nitriding reaction hardly proceeds and a negative electrode material comprising minute crystal grains cannot be obtained. On the other hand, if the raw material comprising a intermetallic compound is provided with a shearing force under an atmosphere of a gas containing nitrogen, the nitriding reaction proceeds efficiently and a negative electrode material comprising a prescribed nitride having an average crystal grain size of 0.001 to 0.1 μm can be obtained. In this case, it is considered that the negative electrode material is a material providing a negative electrode having a high capacity and a long cycle life if it has a content of nitrogen of 1.0% by weight or more, preferably 1.5% by weight or more.

In order to apply a shearing force to the raw material, it is effective to use a ball mill such as a customary ball mill, planetary ball mill, attritor mill (manufactured by UNION PROCESS), and vibratory ball mill.

The negative electrode material of the present invention can also be obtained by mixing, with a compound containing nitrogen, an intermetallic compound containing at least one element(A) selected from the group A and at least one element(B) selected form the group B, applying a shearing force to the resultant raw material mixture, and thereby reacting the intermetallic compound with the compound containing nitrogen. Here, a mechanochemical step can be conducted as the step for applying a shearing force to the raw material mixture.

When the intermetallic compound is mixed with the compound containing nitrogen, the step of applying a shearing force to the raw material mixture is preferably conducted under an inert atmosphere containing argon, for example. The average particle size of the above-mentioned intermetallic compound used here is also preferably 200 μm or less. The above-mentioned intermetallic compound is preferably represented by the general formula: $A^1_x B^1$, where $A^1$ is at least one element(A) selected from the group A, $B^1$ is at least one element(B) selected from the group B, and $0.25 \leq x \leq 4$. In the general formula: $A^1_x B^1$, $A^1$ is preferably Ti or Zr, and $B^1$ is preferably Sn.

The aforementioned compound containing nitrogen preferably further contains at least one element(C) selected from the group C consisting of B, Ba, C, Ca, Ce, Co, Cr, Fe, La, Li, Mg, Mn, Na, Nb, Sr, Ta, V, Y and Yb. A compound containing element(C) and nitrogen is readily decomposed with a shearing force. Nitrogen produced at the time of decomposition reacts with element(A) such as Ti and Zr, and at the same time liberates element(B) such as Sn. Since element(C) itself hardly reacts with lithium, a very minute inert phase is formed. The inert phase thus formed has a strong effect of relaxing the stress from expansion and contraction of the negative electrode material during charging/discharging. Consequently, a negative electrode having a longer cycle life can be obtained.

A compound containing nitrogen and at least one element (D) selected from the group D consisting of Al, Ga and Si may be also preferably used. A compound containing element(D) and nitrogen is also decomposed easily with a shearing force. The nitrogen produced at the time of decomposition reacts with element(A). In this case, a simple substance of element(D) is also liberated at the same time with a simple substance of element(B). Since the simple substance of element(D) also reacts with lithium, a negative electrode material having a high capacity can be obtained.

EXAMPLES

In the following, the present invention will be described in detail with reference to examples. First, a test cell used for measuring the discharge capacity and a cylindrical battery used for measuring the cycle life, as well as measuring methods of the discharge capacity and the cycle life will be described.

Test Cell

A test cell shown in FIG. 1 was produced. First, a mixture was prepared by mixing 7.5 g of a prescribed negative electrode material, 2 g of a graphite power as an electrically conductive agent and 0.5 g of a polyethylene powder as a binder. 0.1 g of this mixture was pressure-molded into a disk having a diameter of 17.5 mm to give an electrode 1, which was placed in a case 2. Next, a separator 3 made of microporous polypropylene film was placed over the electrode 1. Then, a mixed solvent of ethylene carbonate and dimethoxyethane mixed at a volume ratio of 1:1 with 1 mol/liter of lithium perchlorate ($LiClO_4$) dissolved therein was poured into the case 2 as an non-aqueous electrolyte.

Thereafter, the case 2 was sealed with a sealing plate 6 which has a metallic lithium 4 having a diameter of 17.5 mm adhered to the inner surface thereof and has a polypropylene gasket 5 fixed to the circumferential portion thereof, thereby completing the test cell.

Cylindrical Battery

Figure 2:
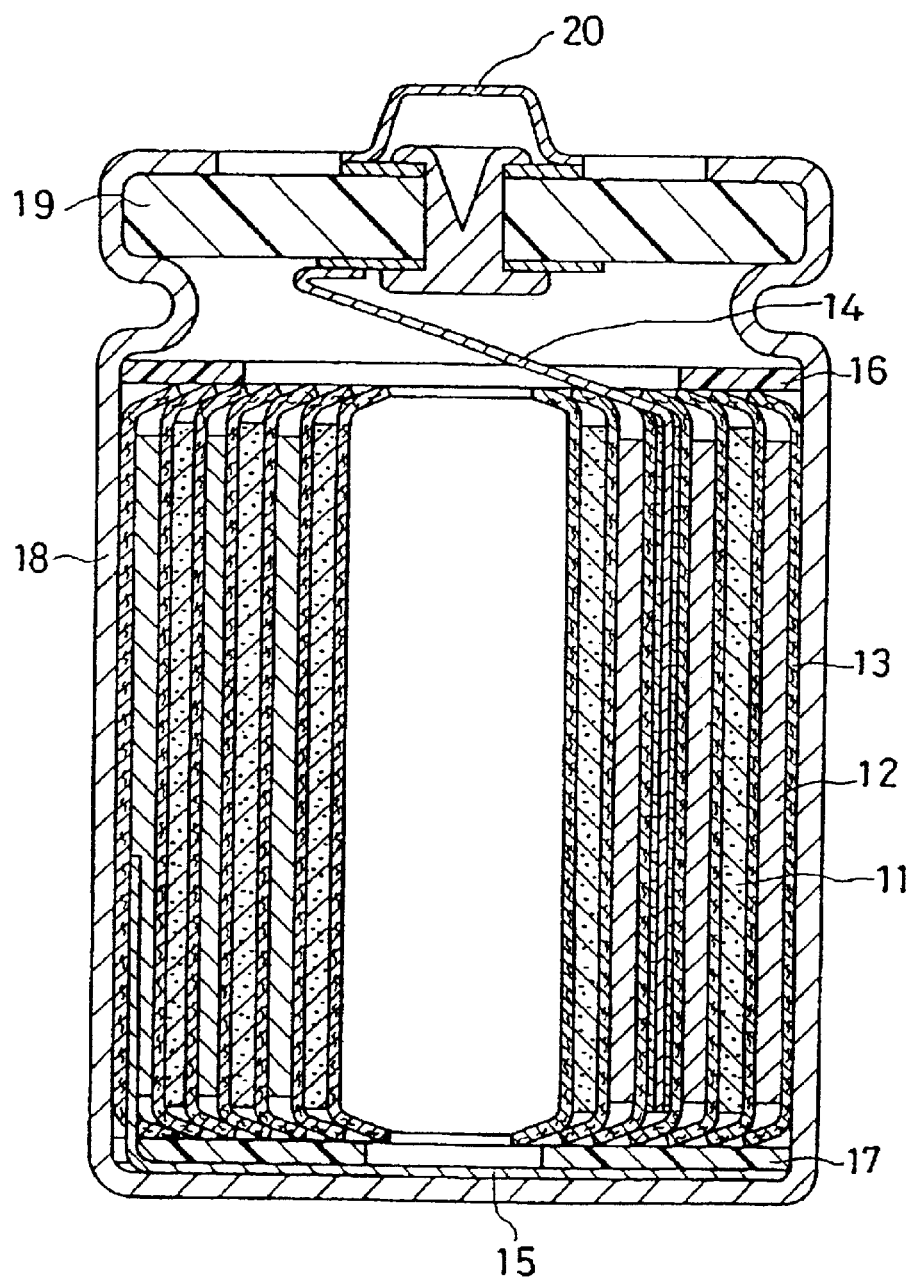
FIG. 2 is a longitudinal cross sectional view of a cylindrical battery of the present invention used in the following Examples for measurement of cycle life.

A cylindrical battery shown in FIG. 2 was produced. First, $LiMn_{1.8}Co_{0.2}O_4$ as a positive electrode active material was synthesized by mixing $Li_2CO_3$, $Mn_3O_4$ and $CoCO_3$ at a prescribed molar ratio and heating the resulting mixture at 900° C. Further, the resulting material was classified to the size of 100 mesh or less to be used as the positive electrode active material. To 100 g of the positive electrode active material, 10 g of a carbon powder as an electrically conductive agent, 8 g of polytetrafluoroethylene dispersed in water as a binder and pure water were added, and sufficiently mixed, which gave a positive electrode mixture paste. This paste was applied onto a core member of aluminum, then dried and rolled to give a positive electrode 11.

A negative electrode mixture paste was prepared by mixing a prescribed negative electrode material, a graphite powder as an electrically conductive agent and a styrene-butadiene rubber as a binder at a weight ratio of 70:20:10, and adding water thereto. Then, this paste was applied onto a core member of copper and dried at 140° C. which gave a negative electrode 12.

Next, a positive electrode lead 14 made of aluminum was fixed to the core member of the positive electrode by ultrasonic welding. In the same manner, a negative electrode lead 15 made of copper was fixed to the core member of the negative electrode. Then, the positive electrode, the negative electrode and a band-like porous polypropylene separator 13, which is wider than the both electrode plates, were laminated. Herein, the separator was interposed between the both electrode plates. Subsequently, the laminate was rolled up cylindrically to form an electrode assembly. The electrode assembly provided with polypropylene insulating plates 16 and 17 on top and bottom thereof was inserted into a battery case 18. After a step portion is formed in upper portion of the battery case 18, a mixed solvent of ethylene carbonate and dimethoxyethane mixed at a volume ratio of 1:1 with 1 mol/liter of $LiClO_4$ dissolved therein was poured therein as a non-aqueous electrolyte. Then, the battery case 18 was sealed with a sealing plate 19 having a positive electrode terminal 20, thereby completing the cylindrical battery.

Method for Measuring the Discharge Capacity

The test cell was subjected to charging (absorption step of lithium into the negative electrode material) at a constant current of 0.5 $mA/cm^2$ until the terminal voltage reached 0 V, and next the test cell was subjected to discharging (desorption step of lithium from the negative electrode material) at a current of 0.5 $mA/cm^2$ until the terminal voltage reached 1.5 V. Then, the discharge capacity (mAh/g) was measured.

In some examples and comparative examples, the difference between the initial charge capacity and the discharge capacity (mA/g) was determined. The larger the value of the difference between the initial charge capacity and the discharge capacity is, the more irreversible reaction takes place at the initial charging and the larger the electrochemically irreversible capacity is.

Method for Measuring the Cycle Life

The cylindrical battery was subjected to the following charge/discharge cycle test at 20° C. First, the cylindrical battery was subjected to a constant-current charging at a charge current of 0.2 C (5 hour rate) until the battery voltage became 4.2 V, then the battery was subjected to a constant-voltage charging at 4.2 V. Thereafter, the cylindrical battery was subjected to discharging at a current of 0.2 C until the battery voltage became 2.5 V. This charge/discharge cycle was repeated, and the capacity maintenance rate (%) was determined by calculating the ratio of the discharge capacity at 100th cycle to the discharge capacity at the first cycle and multiplying the obtained value by 100. The closer to 100 is the capacity maintenance rate, the better the cycle life is.

Example 1

A negative electrode material was synthesized in the following manner. 200 g of a powder of an intermetallic compound (average particle size: 45 μm) having a composition of $Zr_2Ge$ was introduced into an attritor mill (capacity: 1,000 ml) where 1.5 kg of stainless steel ball (diameter: 15 mm) was placed.

The attritor mill used is a vertical rotation type, and it has a valve in top portion and can set the inside thereof to have a selected gas atmosphere having a selected pressure.

The volume that the ball and the raw material powder occupied was about ⅔ of the volume of the inside space of the attritor mill. The inside atmosphere of the attritor mill was a nitrogen atmosphere (100% nitrogen) and was maintained constantly at $1.115 \times 10^5$ Pa.

The rotation speed of the attritor mill was constant at 1,200 rpm. While the mill was operated for 5 hours, a prescribed nitriding reaction was conducted.

The powder obtained after the nitriding reaction was used as the negative electrode material, and then the test cell and the cylindrical battery were produced therefrom to determine the discharge capacity and the capacity maintenance rate. Also, the amount of oxygen and the amount of nitrogen contained in the powder obtained after the nitriding reaction were determined by infrared spectrophotometry (JIS Z 2613) and thermal conductivity method (JIS G 1228), respectively. The results are shown in Table 1.

TABLE 1

| Example No. | Composition of intermetallic compound | Amount of oxygen (wt %) | Amount of nitrogen (wt %) | Discharge capacity (mAh/g) | Capacity maintenance rate (%) |
|---|---|---|---|---|---|
| 1 | $Zr_2Ge$ | 1.3 | 4.0 | 411 | 95 |
| 2 | $Ti_2Sn$ | 1.4 | 4.1 | 386 | 97 |
| 3 | $Mg_2Pb$ | 0.6 | 3.7 | 513 | 89 |
| 4 | NbSb | 0.9 | 4.6 | 409 | 95 |
| 5 | $Ce_2Bi$ | 1.1 | 3.5 | 451 | 92 |

As shown in Table 1, when the powder prepared in Example 1 was used as the negative electrode material, an electrode and a battery having a high capacity and a long cycle life were obtained. Also, it was found that the amount of oxygen contained in the obtained powder was almost the same as the amount of oxygen contained in the raw material powder, and only the amount of nitrogen was greatly increased.

The average particle size of the powder after the nitriding reaction was as minute as about 0.7 μm. When this powder was analyzed by X-ray diffraction, broad peaks were observed, and the particles were found to have a low crystalline or amorphous structure. The phase structure in the particle was analyzed by using the peak of the X-ray diffraction pattern and TEM (transmission electron microscope), and it was found that a plurality of phases and a phase of a nitride of Zr exist in the particle. The average crystal grain size of the nitride was calculated on the basis of the analysis result, and it was found to be about 10 nm. For example, using the obtained X-ray diffraction pattern, the size of the crystal grain was determined from half-width of the peak attributed to the nitride of Zr on the basis of the Scherrer's formula, and it was the same with the previous result.

Examples 2 to 5

The same operation as in Example 1 was made except that powders of intermetallic compounds having compositions of $Ti_2Sn$, $Mg_2Pb$, NbSb and $Ce_2Bi$ (all having an average particle size of 45 μm) were used as the raw material, and evaluations were made in the same manner using the resulting powders. The results are shown in Table 1.

As shown in Table 1, in any of the cases where the powders prepared in Examples 2 to 5 were used as the negative electrode material, an electrode and a battery having a high capacity and a long cycle life were obtained. Also, in any of the cases, it was found that the amount of oxygen was almost the same as the amount of oxygen contained in the raw material powder, and only the amount of nitrogen was greatly increased.

The average particle sizes of the powders after the nitriding reaction were as minute as about 0.7 μm in any case. When these powders were analyzed by X-ray diffraction, broad peaks were observed as in Example 1, and it was found that the particles have a low crystalline or amorphous structure. When the phase structure in the particle of each powder was analyzed by using the peak of the X-ray diffraction pattern and TEM, it was found that a plurality of phases and a phase of a nitride of Ti, Mg, Nb or Ce exist in the particle of each powder. The average crystal grain size of the nitride was calculated, and it was found to be about 10 nm in any powder.

Figure 3:
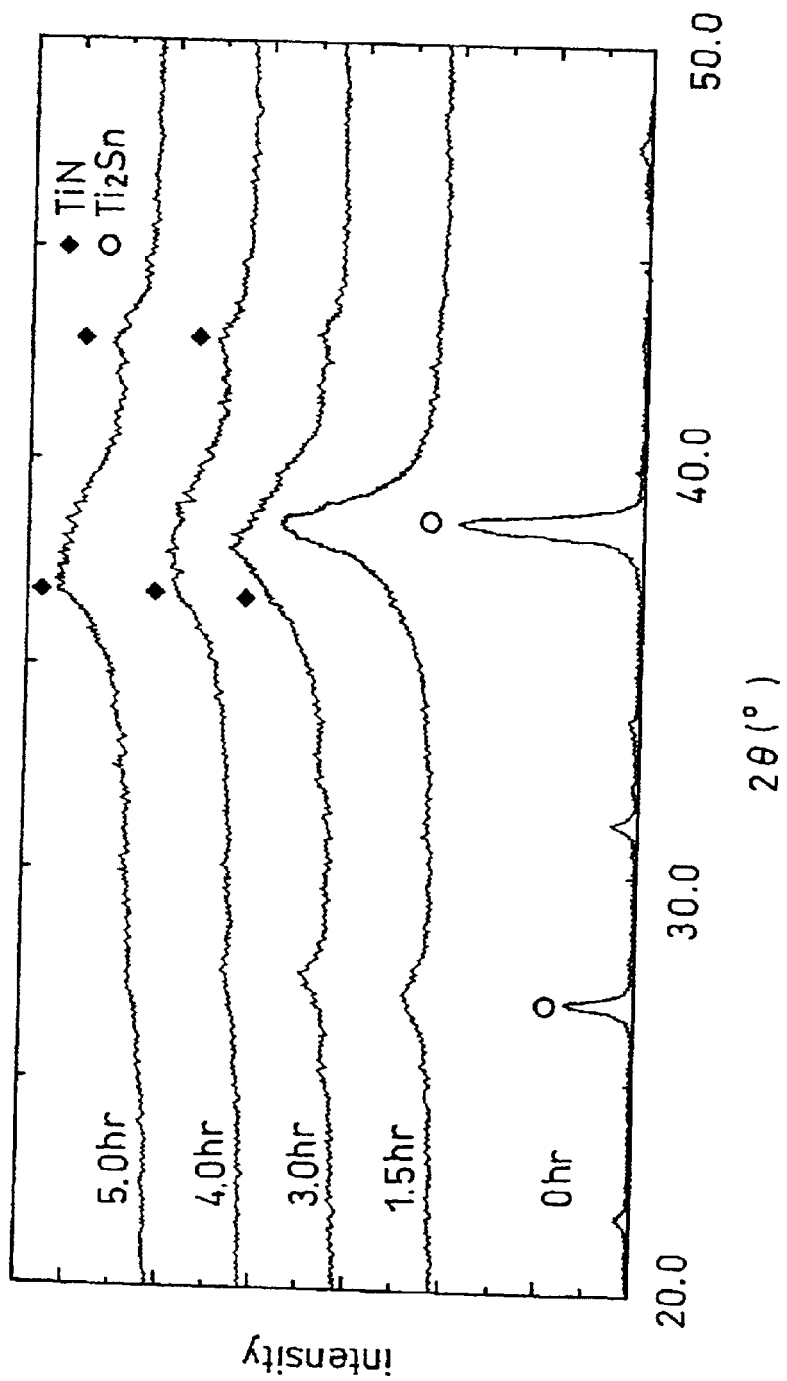
FIG. 3 is a diagram of powder X-ray diffraction patterns showing a step-by-step progress of nitriding reaction of $Ti_2Sn$.

In Example 2 where $Ti_2Sn$ was used as the raw material, the progress of the nitriding reaction of the raw material was followed by X-ray diffraction. A diagram of powder X-ray diffraction patterns showing a step-by-step progress of the nitriding reaction of $Ti_2Sn$ was shown in FIG. 3.

The X-ray diffraction analysis of the powder was made every hour or every 1.5 hour from the start of the reaction. In 1 to 3 hours from the start of the reaction, only the peaks attributed to the intermetallic compound $Ti_2Sn$) as the raw material was observed. From the shape of the pattern, it can be seen that the crystallinity of the intermetallic compound is gradually decreased with the lapse of time. On the other hand, at the point of 4 hours from the start of the reaction, the strength of peaks attributed to $Ti_2Sn$ was decreased, and the peaks attributed to TiN that is a typical example of titanium nitride were observed. At the point of 5 hours from the start of the reaction, the peaks attributed to TiN were observed clearly.

Comparative Examples 1 to 5

The same operations as in Examples 1 to 5 were made except that the inside atmosphere of the attritor mill was an argon atmosphere (argon: 99.99%, pressure: $1.115 \times 10^5$ Pa), and evaluations were made in the same manner. The results are shown in Table 2.

TABLE 2

| Comparative Example No. | Composition of intermetallic compound | Amount of oxygen (wt %) | Amount of nitrogen (wt %) | Discharge capacity (mAh/g) | Capacity maintenance rate (%) |
|---|---|---|---|---|---|
| 1 | $Zr_2Ge$ | 1.0 | 0.5 | 375 | 71 |
| 2 | $Ti_2Sn$ | 1.3 | 0.7 | 342 | 76 |
| 3 | $Mg_2Pb$ | 0.5 | 0.4 | 471 | 64 |
| 4 | NbSb | 0.8 | 0.6 | 369 | 74 |
| 5 | $Ce_2Bi$ | 1.2 | 0.4 | 408 | 69 |

As shown in Table 2, the electrodes using the negative electrode materials of Comparative Examples 1 to 5 had a low discharge capacity and an inferior cycle life as compared to Examples 1 to 5.

The average particle sizes of the powders treated with the mill were all about 0.7 μm, which was similar to Examples 1 to 5. However, under X-ray diffraction analysis, only the presence of low crystalline intermetallic compounds was confirmed but the presence of nitrides was not confirmed.

Also, since the treatment was made under an argon atmosphere, the amount of oxygen and nitrogen contained in the powders after the treatment with the mill was the same as the amount contained in the raw material.

Examples 6 to 10 and Comparative Example 6

The same operation as in Example 1 was made except that an intermetallic compound having a composition represented by $Ti_6Sn_5$ was used as the raw material and that the gas atmosphere inside the attritor mill was agreed to the conditions shown in Table 3, and evaluations were made in the same manner using the resulting powders. The results are shown in Table 4. In Table 4, the difference between the discharge capacity and the charge capacity obtained at the initial charging and discharging was shown as irreversible capacity (mAh/g).

TABLE 3

| | Gas atmosphere |
|---|---|
| Ex. 6 | nitrogen (100%) |
| Ex. 7 | nitrogen (75%) + argon (25%) |
| Ex. 8 | Air [nitrogen (75%) + oxygen (25%)] |
| Ex. 9 | nitrogen (50%) + oxygen (50%) |
| Ex. 10 | nitrogen (50%) + argon (50%) |
| Com. Ex. 6 | argon (100%) |

TABLE 4

|  | Composition of intermetallic compound | Amount of oxygen (wt %) | Amount of nitrogen (wt %) | Discharge capacity (mAh/g) | irreversible capacity (mAh/g) | Capacity maintenance rate (%) |
|---|---|---|---|---|---|---|
| Ex. 6 | $Ti_6Sn_5$ | 1.4 | 3.7 | 433 | 42 | 94 |
| Ex. 7 | $Ti_6Sn_5$ | 0.8 | 3.6 | 451 | 47 | 95 |
| Ex. 8 | $Ti_6Sn_5$ | 3.8 | 4.2 | 467 | 73 | 97 |
| Ex. 9 | $Ti_6Sn_5$ | 4.7 | 4.1 | 472 | 91 | 93 |
| Ex. 10 | $Ti_6Sn_5$ | 0.9 | 3.9 | 403 | 43 | 90 |
| Com. Ex. 6 | $Ti_6Sn_5$ | 0.5 | 0.4 | 340 | 39 | 73 |

As shown in Table 4, in any of the cases where the respective powders prepared in Examples 6 to 10 were used as the negative electrode material, an electrode and a battery having a high capacity and a long life was obtained. However, when the powder prepared in Comparative Example 6 was used as the negative electrode material, the discharge capacity and the cycle life were unsatisfactory.

The average particle sizes of the powders treated with the mill were all as minute as about 0.7 μm. When all the powders were analyzed by X-ray diffraction, all of them had a low crystalline or amorphous structure. Further, nitrides of Ti existed in all the powders except for the powder of Comparative Example 6, and a plurality of phases containing an oxide of Ti was observed in the powders of Examples 8 and 9. The amount of nitrogen contained in the powders of Examples 6 to 10 was increased after the treatment in any of the cases, but the amount of nitrogen contained in the obtained powder of Comparative Example 6 was very small and it was about the same as the amount contained in the raw material. The powders treated in a gas atmosphere containing oxygen also had a greatly increased amount of oxygen. Consequently, the powders of Example 8 and 9 had a relatively large irreversible capacity. On the other hand, the powders of Example 8 and 9 had an extremely good capacity maintenance rate.

Example 11

A negative electrode material was synthesized in the following manner. In attritor mill (capacity: 1,000 ml) in which 1.5 kg of stainless steel ball (diameter: 15 mm) was placed, 200 g of an intermetallic compound having a composition of $Zr_2Ge$ (average particle size: 45 μm) and 30 g of $Li_3N$ which is a compound containing nitrogen were introduced. Herein, the same attritor mill as used in Example 1 was used.

The volume occupied by the ball and the raw material powder was about ¾ of the volume of the inside space of the attritor mill. The atmosphere inside the attritor mill was an argon atmosphere (100% argon) and the pressure therein was maintained constantly at $1.05 \times 10^5$ Pa.

The rotation speed of the attritor mill was constant at 1,200 rpm, and a prescribed reaction was conducted by operating the mill for 5 hours.

Using the powder obtained after the reaction as the negative electrode material, an evaluation was made in the same manner as in Example 1. The result is shown in Table 5.

TABLE 5

| Example No. | Composition of intermetallic compound | Amount of oxygen (wt %) | Amount of nitrogen (wt %) | Discharge capacity (mAh/g) | Capacity maintenance rate (%) |
|---|---|---|---|---|---|
| 11 | $Zr_2Ge$ | 0.4 | 4.9 | 413 | 90 |
| 12 | $Zr_2Ge$ | 0.5 | 3.7 | 576 | 87 |

As shown in Table 5, when the powder prepared in Example 11 was used as the negative electrode material, an electrode and a battery having a high capacity and a long cycle life were obtained.

The average particle size of the powder treated with the mill was as minute as about 0.9 μm. When this powder was analyzed by X-ray diffraction, broad peaks were observed and it was found that the particles have a low crystalline or amorphous structure. The phase structure in the particle was analyzed by using the peak of the X-ray diffraction pattern and TEM, and it was found that a plurality of phases and a phase of a nitride of Zr exist in the particle. Also, the average crystal grain size of the nitride was calculated on the basis of the analysis result, and it was found to be about 10 nm.

Example 12

The same operation as in Example 1 was made except that GaN was used in place of $Li_3N$ as a compound containing nitrogen, and an evaluation was made in the same manner using the resulting powder. The result is shown in Table 5.

As shown in Table 5, when the powder prepared in Example 12 was used as the negative electrode material, an electrode having a higher capacity than that of Example 11 was obtained.

The average particle size of the powder treated with the mill was as minute as about 0.8 μm. When this powder was analyzed by X-ray diffraction, broad peaks were observed, and it was found that the particles have a low crystalline or amorphous structure. The phase structure in the particle was analyzed by using the peak of the X-ray diffraction pattern and TEM, and it was found that a plurality of phases and a phase of a nitride of Zr exist in the particle. Further, the average crystal grain size of the nitride was calculated, and it was found to be about 15 nm.

Examples 13 to 17

The same operation as in Example 11 was made except that the respective powders of intermetallic compounds having compositions of $Ti_2Sn$, $Mg_2Pb$, NbSb, $Ce_2Bi$ and $Zr_2Sn$ were used as the raw materials and that GaN was used as a compound containing nitrogen. Then, evaluations were made in the same manner using the resulting powders. The results are shown in Table 6.

TABLE 6

| Example No. | Composition of intermetallic compound | Amount of oxygen (wt %) | Amount of nitrogen (wt %) | Discharge capacity (mAh/g) | Capacity maintenance rate (%) |
|---|---|---|---|---|---|
| 13 | $Ti_2Sn$ | 0.7 | 4.2 | 406 | 93 |
| 14 | $Mg_2Pb$ | 0.8 | 3.6 | 520 | 88 |
| 15 | NbSb | 0.6 | 2.9 | 435 | 92 |
| 16 | $Ce_2Bi$ | 0.9 | 3.2 | 481 | 89 |
| 17 | $Zr_2Sn$ | 1.0 | 5.1 | 525 | 90 |

As shown in Table 6, in any of the cases where the respective powders prepared in Examples 13 to 17 were used as the negative electrode material, an electrode and a battery having a high capacity and a long life were obtained.

The average particle sizes of the powders treated with the mill were as minute as about 0.8 μm. When these powders were analyzed by X-ray diffraction, broad peaks were observed, and it was found that the particles have a low crystalline or amorphous structure. The phase structure in the particle in each powder was analyzed by using the peak of the X-ray diffraction pattern and TEM, and it was found that a plurality of phases including a phase of a nitride of element(A) exist in the particle. Further, the average crystal grain size of each nitride was calculated on the basis of the analysis results, and it was found to be about 10 nm.

In above-described Examples, description was made using $LiMn_{1.8}Co_{0.2}O_4$ as the positive electrode active material; however, similar effects are expected when $LiMn_2O_4$, $LiCoO_2$ and $LiNiO_2$ are used.

As described above, the present invention provides a negative electrode material displaying a satisfactory effect of relaxing the stress caused by absorption of lithium in the material and thereby suppressing expansion or pulverization of the material. Also, the use of a negative electrode containing such a negative electrode material gives a non-aqueous electrolyte secondary battery having a high capacity and a long cycle life as well as excellent high rate discharge characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a negative electrode material for a non-aqueous electrolyte secondary battery including the steps of:

providing an intermetallic compound comprising at least one element (A) which reacts with nitrogen to form a nitride and is substantially non-reactive with lithium, and at least one element (B) that is substantially non-reactive with nitrogen and reacts with lithium, and applying a shearing force to said intermetallic compound under a nitrogen-containing atmosphere to make said intermetallic compound react with nitrogen, thereby forming a mixture containing at least one nitride of said element (A), and at least one substance of said element (B).

2. The method for producing a negative electrode material for a non-aqueous electrolyte secondary battery in accordance with claim 1, wherein said at least one element (A) is selected from the group A consisting of Ce, Co, Cr, Fe, La, Mn, Mo, Nb, P, Sc, Sr, Ta, Ti, V, Y, Yb, Zr, B, Ca, Mg, Na and Zn, and said at least one element (B) is selected from the group B consisting of Ge, Sn, Pb, Sb and Bi.

3. The method for producing a negative electrode material for a non-aqueous electrolyte secondary battery in accordance with claim 1, wherein said nitrogen-containing atmosphere is an atmosphere of a gas containing 50% by volume or more of nitrogen.

4. The method for producing a negative electrode material for a non-aqueous electrolyte secondary battery in accordance with claim 3, wherein the pressure of said gas is $1.0 \times 10^5$ Pa or more.

5. The method for producing a negative electrode material for a non-aqueous electrolyte secondary battery in accordance with claim 1, wherein the step of applying a shearing force to said intermetallic compound is performed by a mechanochemical method.

6. The method for producing a negative electrode material for a non-aqueous electrolyte secondary battery in accordance with claim 1, wherein said intermetallic compound is represented by the general formula: $A^1_x B^1$, where $A^1$ is said at least one element (A), $B^1$ is said at least one element (B), and $0.25 \leq x \leq 4$.

7. The method for producing a negative electrode material for a non-aqueous electrolyte secondary battery in accordance with claim 6, wherein $A^1$ is Ti or Zr, and $B^1$ is Sn.

8. A method for producing a negative electrode material for a non-aqueous electrolyte secondary battery including the steps of:

providing an intermetallic compound comprising at least one element (A) which reacts with nitrogen to form a nitride and is substantially non-reactive with lithium, and at least one element (B) that is substantially non-reactive with nitrogen and reacts with lithium, mixing said intermetallic compound with a compound containing nitrogen to obtain a raw material mixture, and applying a shearing force to said raw material mixture to make said intermetallic compound react with said compound containing nitrogen, thereby forming a mixture containing at least one nitride of said element (A), and at least one substance of said element (B).

9. The method for producing a negative electrode material for a non-aqueous electrolyte secondary battery in accordance with claim 8, wherein said at least one element (A) is selected from the group A consisting of Ce, Co, Cr, Fe, La, Mn, Mo, Nb, P, Sc, Sr, Ta, Ti, V, Y, Yb, Zr, B, Ca, Mg, Na and Zn, and said at least one element (B) is selected from the group B consisting of Ge, Sn, Pb, Sb and Bi.

10. The method for producing a negative electrode material for a non-aqueous electrolyte secondary battery in accordance with claim 8, wherein said intermetallic compound is represented by the general formula: $A^1_x B^1$, where $A^1$ is said at least one element (A), $B^1$ is said at least one element (B), and $0.25 \leq x \leq 4$.

11. The method for producing a negative electrode material for a non-aqueous electrolyte secondary battery in accordance with claim 10, wherein $A^1$ is Ti or Zr, and $B^1$ is Sn.

12. The method for producing a negative electrode material for a non-aqueous electrolyte secondary battery in accordance with claim 8, wherein said compound containing nitrogen further contains at least one element (C) selected from the group C consisting of B, Ba, C, Ca, Ce, Co, Cr, Fe, La, Li, Mg, Mn, Na, Nb, Sr, Ta, V, Y and Yb.

13. The method for producing a negative electrode material for a non-aqueous electrolyte secondary battery in accordance with claim 8, wherein said compound containing nitrogen further contains at least one element (D) selected from the group D consisting of Al, Ga and Si.

14. The method for producing a negative electrode material for a non-aqueous electrolyte secondary battery in accordance with claim 8, wherein the step of applying a shearing force to said raw material mixture is performed by a mechanochemical method and is conducted under an inert atmosphere containing Argon.

15. A negative electrode material for a non-aqueous electrolyte secondary battery comprising:

at least one nitride of an element (A) selected from the group A consisting of Ce, Cr, Fe, La, Mn, Mo, Nb, P, Sc, Sr, Ta, Ti, V, Y, Yb, Zr, B, Ca, Mg, Na and Zn; and at least one substance of an element (B) selected from the group B consisting of Ge, Sn, Pb, Sb and Bi;

wherein the average crystal grain size of said nitride is 0.001 to 0.1 μm.

16. The negative electrode material for a non-aqueous electrolyte secondary battery in accordance with claim 15, wherein the content of nitrogen is 1.0% by weight or more.

17. A negative electrode for a non-aqueous electrolyte secondary battery containing 15 to 95% by weight of the negative electrode material in accordance with claim 15.

18. A non-aqueous electrolyte secondary battery comprising a positive electrode capable of absorbing and desorbing lithium, the negative electrode in accordance with claim 17 and a non-aqueous electrolyte.

19. A negative electrode material for a non-aqueous electrolyte secondary battery comprising:

at least one nitride of an element (A) selected from the group A consisting of Ce, Co, Cr, Fe, La, Mn, Mo, Nb, P, Sc, Sr, Ta, Ti, V, Y, Yb, Zr, B, Ca, Mg, Na and Zn; and at least one substance of an element (B) selected from the group B consisting of Ge, Sn, Pb and Bi;

wherein the average crystal grain size of said nitride is 0.001 to 0.1 μm.

20. The negative electrode material for a non-aqueous electrolyte secondary battery in accordance with claim 19, wherein the content of nitrogen is 1.0% by weight or more.

21. A negative electrode for a non-aqueous electrolyte secondary battery containing 15 to 95% by weight of the negative electrode material in accordance with claim 19.

22. A non-aqueous electrolyte secondary battery comprising a positive electrode capable of absorbing and desorbing lithium, the negative electrode in accordance with claim 21 and a non-aqueous electrolyte.

* * * * *